United States Patent
Park et al.

(10) Patent No.: US 8,930,442 B2
(45) Date of Patent: Jan. 6, 2015

(54) APPARATUS AND METHOD FOR PLAYING MEDIA CONTENT DATA

(75) Inventors: Kyung-Mo Park, Seoul (KR); Jae-Yeon Song, Seoul (KR); Sung-Ryeul Rhyu, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 29 days.

(21) Appl. No.: 13/042,929

(22) Filed: Mar. 8, 2011

(65) Prior Publication Data
US 2011/0219063 A1    Sep. 8, 2011

(30) Foreign Application Priority Data
Mar. 8, 2010   (KR) ........................ 10-2010-0020544

(51) Int. Cl.
G06F 15/16    (2006.01)
H04N 21/858    (2011.01)
H04N 21/472    (2011.01)
H04N 21/658    (2011.01)
H04N 21/2387    (2011.01)

(52) U.S. Cl.
CPC ..... H04N 21/8586 (2013.01); H04N 21/47202 (2013.01); H04N 21/6581 (2013.01); H04N 21/2387 (2013.01)
USPC ........... 709/203; 709/217; 709/220; 709/227; 709/230; 709/247

(58) Field of Classification Search
USPC ......... 709/203, 220, 227, 230, 217, 231, 232, 709/234, 235, 247
See application file for complete search history.

(56) References Cited

U.S. PATENT DOCUMENTS

| | | | | |
|---|---|---|---|---|
| 6,041,396 | A * | 3/2000 | Widigen | 711/206 |
| 6,813,690 | B1 * | 11/2004 | Lango et al. | 711/118 |
| 6,925,474 | B2 | 8/2005 | McGrath et al. | |
| 7,376,790 | B2 * | 5/2008 | Lango et al. | 711/126 |
| 7,383,565 | B1 | 6/2008 | Fakharzadeh | |
| 7,574,650 | B1 * | 8/2009 | Staats | 715/201 |
| 7,844,624 | B2 | 11/2010 | Kinno et al. | |
| 8,266,248 | B2 * | 9/2012 | Belimpasakis et al. | 709/218 |
| 2002/0116392 | A1 | 8/2002 | McGrath et al. | |

(Continued)

FOREIGN PATENT DOCUMENTS

| | | |
|---|---|---|
| CN | 1689329 | 10/2005 |
| CN | 101523906 | 9/2009 |

(Continued)

OTHER PUBLICATIONS

Shih-Yu Huang, "Improved Techniques for Dual-Bitstream MPEG Video Streaming with VCR Functionalities", IEEE Transactions on Consumer Electronics, Nov. 1, 2003.
Kostas E. Psannis et al., "MPEG-2 Streaming of Full Interactive Content", IEEE Transactions on Circuits and Systems for Video Technology, vol. 16, No. 2, Feb. 1, 2006.
Zhou Jun et al., "VCR Functionalites with Adaptive Rate Adjustment in Streaming Media Server", IEEE Ninth International Conference on Computer and Information Technology, XP031564415, Oct. 11, 2009.
NISO: Understanding Metadata, XP-002708010, Jul. 30, 2013.

Primary Examiner — Michael Y Won
(74) Attorney, Agent, or Firm — The Farrell Law Firm, P.C.

(57) ABSTRACT

A method is provided for playing media content by a client in a data communication network, in which a request for a media content descriptor is sent to a server, a media content descriptor including a Uniform Resource Locator (URL) for an access to specific media content data configured for execution of a specific function is received from the server, and the specific media content data is received using the URL included in the received media content descriptor.

9 Claims, 8 Drawing Sheets

(56) References Cited

U.S. PATENT DOCUMENTS

| | | |
|---|---|---|
| 2003/0095791 A1* | 5/2003 | Barton et al. .................. 386/83 |
| 2004/0133923 A1* | 7/2004 | Watson et al. ................ 725/134 |
| 2004/0139157 A1* | 7/2004 | Neely et al. .................. 709/205 |
| 2005/0060350 A1* | 3/2005 | Baum et al. ................ 707/104.1 |
| 2006/0059267 A1* | 3/2006 | Cugi et al. ................... 709/230 |
| 2007/0094691 A1* | 4/2007 | Gazdzinski ..................... 725/62 |
| 2007/0162568 A1 | 7/2007 | Gupta et al. |
| 2009/0228920 A1* | 9/2009 | Tom et al. ........................ 725/35 |
| 2009/0300673 A1* | 12/2009 | Bachet et al. ................... 725/31 |
| 2010/0119206 A1* | 5/2010 | Craner et al. .................. 386/68 |
| 2010/0293472 A1 | 11/2010 | Asai |
| 2011/0119465 A1* | 5/2011 | Suzuki et al. ................. 711/171 |
| 2011/0145726 A1* | 6/2011 | Wei et al. ..................... 715/752 |
| 2011/0313856 A1* | 12/2011 | Cohen et al. ................ 705/14.49 |
| 2012/0090009 A1* | 4/2012 | Cook et al. ...................... 725/52 |
| 2012/0096083 A1* | 4/2012 | Teng et al. .................... 709/203 |
| 2013/0227088 A1 | 8/2013 | Watson et al. |

FOREIGN PATENT DOCUMENTS

| | | |
|---|---|---|
| EP | 2 023 266 | 2/2009 |
| EP | 2 071 847 | 6/2009 |
| EP | 2 136 314 | 12/2009 |
| JP | 2002-318803 | 10/2002 |
| JP | 2004-350043 | 12/2004 |
| JP | 2008-199632 | 8/2008 |
| JP | 2009-021748 | 1/2009 |
| WO | WO 2010/025185 A1 | 3/2010 |

* cited by examiner

APPARATUS AND METHOD FOR PLAYING MEDIA CONTENT DATA

PRIORITY

This application claims priority under 35 U.S.C. §119(a) to a Korean Patent Application filed in the Korean Intellectual Property Office on Mar. 8, 2010 and assigned Serial No. 10-2010-0020544, the entire content of which is incorporated herein by reference.

BACKGROUND OF THE INVENTION

1. Field of the Invention

The present invention relates generally to an apparatus and method for playing media content data, and more particularly, to a media content playing apparatus and method for minimizing delays in an X-speed play function (where X is a specific number) and a random access function regarding play of media content data received from a data communication network.

2. Description of the Related Art

In general, methods for accessing a variety of media content services over a data communication network may be roughly classified into a download method and a streaming method. The media content services refer to services provided by various types of digital media data, such as broadcasts, movies, and music. Herein, "digital media data" refers to digital information constituting associated media content, such as videos, sounds, scenes, etc.

The download method allows a user to download digital media data constituting desired media content service in non-real time, store the downloaded digital media data in a storage media, and play the stored digital media data at a desired time. The download method is mainly used for non-real time media content services, such as movies and dramas.

The streaming method allows a user to receive digital media data presently required, and play the received digital media data in real time. The streaming method is mainly used for real-time media content services corresponding to live broadcasts, such as news and sports broadcasts.

While receiving a media content service, a user may sometimes desire to play media content data at a faster playback speed than the normal playback speed (which is called 'X-speed play'), or to play a specific part of the media other than a part of the media currently being played (which is called 'random access').

Conventionally, if a user requests X-speed play or random access based on a Moving Picture Experts Group (MPEG) file format, the X-speed play or random access requested by the user may not be precisely performed, because the existing MPEG file format is implemented based on a file format, in which broadcast by a server is considered, rather than a communication network between a client and a server is considered.

Therefore, when the communication network between a client and a server is considered, it is not possible to precisely provide the X-speed play function and random access function required by the user based on the existing MPEG file format. Accordingly, there has been a long demand for a method for precisely providing the X-speed play and random access functions based on the existing MPEG file format.

SUMMARY OF THE INVENTION

An aspect of the present invention is to address at least the above-mentioned problems and/or disadvantages and to provide at least the advantages described below. Accordingly, an aspect of the present invention is to provide a media content playing apparatus and method for precisely controlling streaming/download-based media content data.

Another aspect of the present invention provides a media content playing apparatus and method for controlling media content data consisting of stream groups for an X-speed play function and a random access function.

Another aspect of the present invention provides a media content playing apparatus and method for providing media content data capable of being adjusted and controlled according to various content types and user preferences by providing semantic configuration and role information of media content provided.

In accordance with one aspect of the present invention, there is provided a method for playing media content by a client in a data communication network. The method includes sending, to a server, a request for a media content descriptor; receiving, from the server, a media content descriptor including a Uniform Resource Locator (URL) for an access to specific media content data configured for execution of a specific function; and receiving the specific media content data using the URL included in the received media content descriptor.

In accordance with another aspect of the present invention, there is provided a method for supporting media content play of a client by a server in a data communication network. The method includes receiving, from the client, a request for a media content descriptor; and transmitting, to the client, a media content descriptor including a Uniform Resource Locator (URL) for an access to specific media content data configured for execution of a specific function.

In accordance with another aspect of the present invention, there is provided an apparatus for playing media content by a client in a data communication network. The apparatus includes a controller for sending, to a server, a request for a media content descriptor, receiving, from the server, a media content descriptor including a Uniform Resource Locator (URL) for an access to specific media content data configured for execution of a specific function, and receiving the specific media content data using the URL included in the received media content descriptor.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, the same drawing reference numerals refer to the same elements, features and structures.

DETAILED DESCRIPTION OF EMBODIMENTS OF THE PRESENT INVENTION

Figure 1:
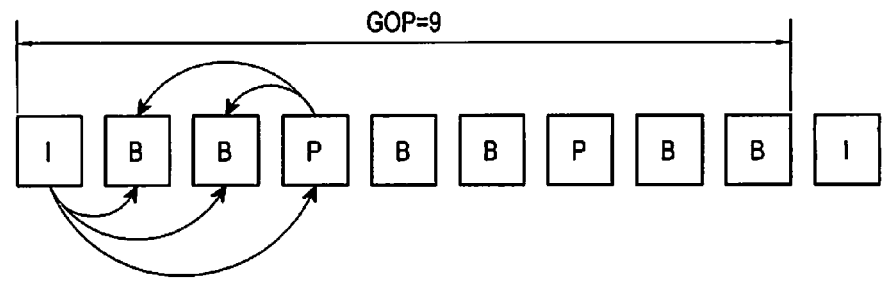
FIG. 1 is a diagram illustrating an arrangement of I, P, and B frames in conventional single-layer coding.

Embodiments of the present invention will now be described in detail with reference to the accompanying drawings. In the following description, specific details such as detailed configuration and components are merely provided to assist the overall understanding of embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

In the following description, an operation mode in which media content data is played at a normal speed is called a 'normal play mode' or 'normal mode', while an operation mode in which media content data is played at nX-speed (where n is a specific number designating a multiplier of a normal speed, which is equivalent to 1X-speed) upon an X-speed play request of a user is referred to as an 'X-speed play mode' or 'X-speed mode' herein. A play request made by a user to play media content data beginning from a specific time is referred to as a 'random access request', and an operation mode launched by the random access request is referred to as a 'random access mode' herein. A combination of the X-speed play mode and the random access mode is referred to as a 'trick mode' herein.

Embodiments of the present invention provide a method for minimizing a time delay that may occur in the X-speed mode and/or the random access mode during a media content play operation. In such a method, while media content data received and compressed by a video streaming/download service is being played, if a user requests an X-speed play function (e.g., 2X or 0.5X speed play), or requests to play the media content data beginning from a specific time, a time delay between the user request and a start of the play may be reduced, enabling precise play upon user request.

In addition, embodiments of the present invention provide a user-friendly operation, when switching from the X-speed play mode and/or random access mode back to the normal play mode.

MPEG2, MPEG4, H.263, and H.264, which are non-limiting examples of technologies related to embodiments of the present invention, and video compression technologies such as High-efficiency Video Coding (HVC), which have recently emerged as standards for digital media, use the following three schemes to increase compression efficiency:

A first scheme for increasing compression efficiency includes converting a Red/Green/Blue (RGB) input into a luminance/blue-chrominance/red-chrominance (YCbCr) input. In this scheme, duplicate luminance and chrominance information in the RGB input is converted into Y information and Cb and Cr information, respectively.

A second scheme for increasing compression efficiency includes removing spatial redundancy of the converted data. In this scheme, the spatial similarity in one screen (or one-screen data) is removed using Discrete Cosine Transform (DCT), quantization, and Variable Length Coding (VLC).

A third scheme for increasing compression efficiency includes removing temporal redundancy between consecutive screens, based on similarity of parts of successive images that are close to each other in time. This temporal redundancy may be removed by a prediction technique such as Differential Pulse Code Modulation (DPCM), using a Motion Vector (MV) measured by Motion Estimation (ME).

FIG. 1 illustrates an example of a method for removing temporal redundancy, and shows an arrangement of Intra (I), Predictive (P), Bi-directional (B) frames in general single-layer coding, and reference relationships between them.

To remove the temporal redundancy, types of frames are set as shown in FIG. 1 in the MPEG technology, and the types of frames are classified into I, P, and B frames. The I frame, an independent frame, can be decoded using only its own data. The P frame is decoded by referencing the preceding I frame. The B frame is decoded by referencing the preceding I frame and the succeeding P frame.

In every coding scheme, generally, the first screen is coded with an I frame, while the succeeding screens undergo coding with P frames or B frames, in order to reduce a bit rate. However, in the case where only P frames and B frames continuously exist, once an error occurs while the P or B frames are being decoded in a reception side, successive errors may occur. In this case, if a user requests a random access to a specific frame, decoding for a precise random access to the frame may be difficult to perform.

Therefore, an I frame is periodically inserted between the consecutive P and B frames, which is called 'intra-refresh'. The number of frames between an arbitrary I frame and its next I frame is called a Group of Picture (GOP). In the example of FIG. 1, a GOP value is 9.

Figure 2:
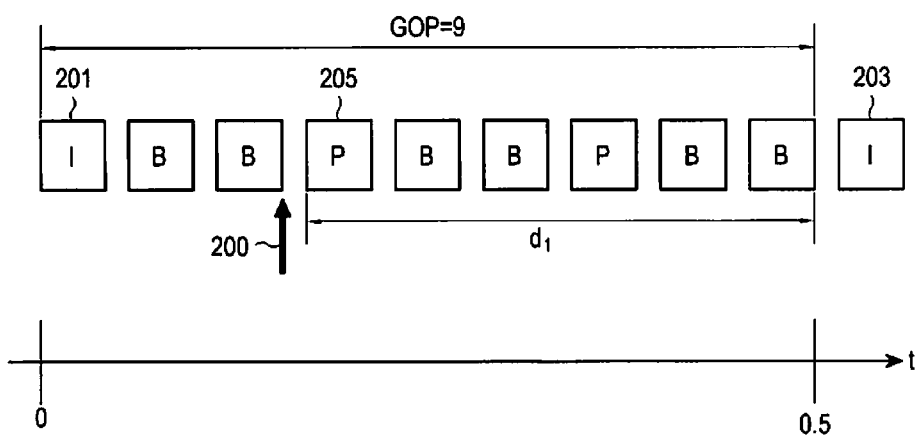
FIG. 2 is a diagram illustrating a problematic situation occurring in conventional X-speed play and random access.

FIG. 2 illustrates possible problems, which may occur when normal-mode data configured for normal play is played in an X-speed play mode or a random access mode.

Frames on the upper part of FIG. 2 represent normal-mode data configured for normal play. Generally, in the normal-mode data is inserted an I frame for intra-refresh once every 15 frames. In this case, for a video clip configured to include 30 frames per second, i.e., for a video clip configured to have two I frames inserted per second, since a time difference between the two I frames is 0.5 second, if a random access is made on this video clip, a time delay of up to 0.5 second may occur. The same problem may occur not only in the streaming video clips such as broadcasts, but also when video clips having been downloaded and stored in advance, are played.

Referring to FIG. 2, two instances of accessing normal mode data are considered. More specifically, an instance where random access is performed with normal-mode data, and an instance where X-speed play is performed with normal-mode data.

Regarding use of a random access mode with normal-mode data, if a random access request is made by a user in a specific frame within a GOP period between an I frame 201 and the next I frame 203, a client starts decoding beginning from the next I frame 203 after moving by a specific time $d_1$, instead of starting the decoding beginning from a P frame 205 right after the time 200 the random access request was made. This is because the initial decoding starts at an I frame, as described above. In this case, as the time the random access was requested by the user is different from the time the decoding actually starts, no frames are played in a period between the two times, making it impossible to precisely carry out the random access operation requested by the user.

Regarding X-speed play with normal-mode data, when the normal-mode data undergoes X-speed play, only I frames are decoded for fast play, making it difficult to efficiently support the X-speed play function for X=non-integer (e.g., 1.2 or 0.4), rather than for X=integer (e.g., 1 and 2).

Therefore, embodiments of the present invention provide a method for supporting an efficient X-speed play mode, and minimizing time delays occurring when a random access request is made.

Figure 3:
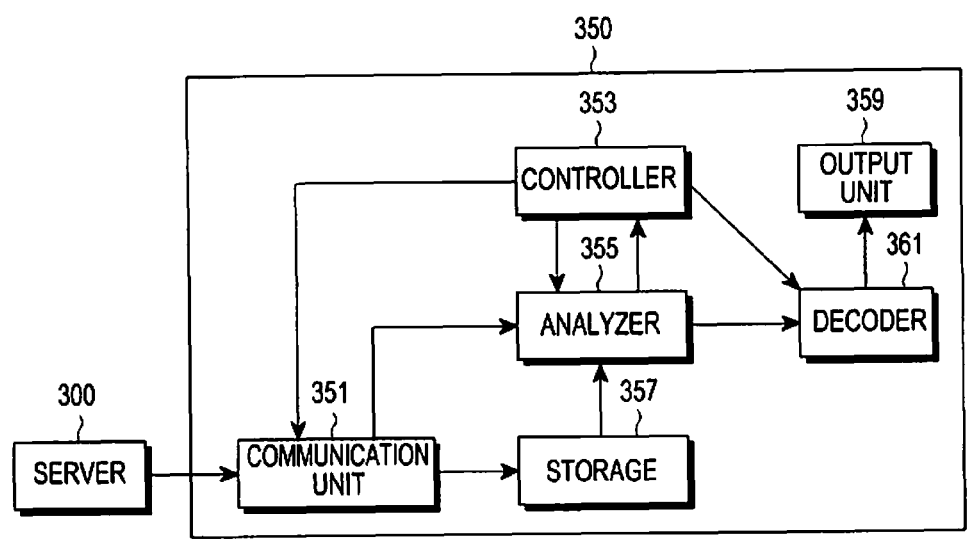
FIG. 3 is a block diagram of a media content playing apparatus according to an embodiment of the present invention.

FIG. 3 illustrates a block diagram of a media content playing apparatus according to an embodiment of the present invention.

Referring to FIG. 3, a client 350 is connected to an external server 300 over a communication network (not shown). The client 350 is a device for playing, in real time, media content data received from the server 300 by the streaming or download method, or for recording parts of the received media content data in a storage 357, analyzing the stored media content data, and playing the analyzed media content data. The client 350 may include Digital TeleVisions (DTVs), personal computers, Digital Versatile Disc (DVD) players, etc.

Although the client 350 illustrated in FIG. 3 is adapted to store media content data in an embodiment of the present invention, this configuration does not limit the present invention thereto, and the client 350 may have only the function of playing media content data in real time, without the storage function in accordance with embodiments of the present invention. The communication network connecting the client 350 to the server 300 includes any wired/wireless communication networks.

The server 300 may be managed by a broadcasting station, a telecommunication operator, a film producer, or a private content provider. The server 300 may store various complex media content data, such as audio data, video data, text data, image data, etc., and metadata therefor.

Referring to FIG. 3, the client 350 receives media content data from the server 300. However, the client 350 may receive media content data from a database rather than the server 300.

The client 350 includes a communication unit 351, the storage 357, an analyzer 355, a decoder 361, a controller 353, and an output unit 359. Although not illustrated in FIG. 3, the client 350 may further include a user interface responsible for interfacing with a user. The user may send a request to the controller 353 using the user interface. Generally, the user interface, which receives user inputs, may include a physical conversion unit, such as a keyboard, a mouse, a touch screen, a haptic device, and a microphone. The user interface receives command, text, event, number, or voice information from the user, and provides the received information to the controller 353.

According to embodiments of the present invention, the user may control the controller 353 using the user interface to play media content data corresponding to the current GOP period in an X-speed play mode, and may also set a play mode in which the user desires to play media content data of the next GOP period, while the media content data of the current GOP period is being played in the X-speed play mode.

The communication unit 351 is connected to the server 300 or a third database (not shown) over a wired/wireless network, and exchange data with the server 300 or the third database. If the client 350 uses wireless network technology, the communication unit 351 may transmit/receive control commands and data between the server 300 and the client 350 using the common data packet communication method. The communication method may include mobile communication technologies, such as Wireless Local Area Network (WLAN), Bluetooth, Zigbee, Wireless Broadband (WiBro), Wireless Media (WiMedia), 3rd Generation (3G) Code Division Multiple Access (CDMA).

The storage 357 stores the information that the communication unit 351 has received from the server 300 or the third database. The analyzer 355 analyzes media content data stored in the storage 357, and provides the analyzed media content data to the decoder 361.

The decoder 361 decodes the media content data analyzed by the analyzer 355 using an inverse method of the coding method based on an MPEG file format according to embodiments of the present invention, and provides the decoded media content data to the output unit 359. If the media content data includes different types of data, the decoder 361 selects required media content data and provides it to the output unit 359.

For example, if the media content data includes 'normal-mode data' for the normal play mode and 'trick-mode data' for the X-speed play mode or the random access mode, and the X-speed play mode is selected, then the controller 353 may select the trick-mode data and provide the trick-mode data to the decoder 361.

The output unit 359 may output the media content data decoded by the decoder 361 to the screen. The output unit 359 may output the overall condition of the client 350 and the information that the user has input through the user interface, to the screen or the speaker.

Although not illustrated in FIG. 3, the client 350 operates based on system time information.

While media content data of the initial GOP period is played in an X-speed play mode, the user may set a play mode for playing media content data of the next GOP period, using the user interface. In some cases, the client 350 may decode media content data of the next GOP period using a method predefined therein, regardless of user operations.

Table 1 shows a structure of a media content descriptor according to an embodiment of the present invention. The media content descriptor is information provided from a server or the third database to a terminal or a client, and includes various information that the terminal (or client) requires to perform a function associated with its media content data.

For example, referring to Table 1, a media content descriptor according to an embodiment of the present invention includes not only information for the normal play mode, but also information for the X-speed play mode and the random access mode.

The media content descriptor may be included in media content data when the media content service is initially launched, or included in the media content data periodically, and then transmitted from the server or the third database to the terminal (or client). In one example, only part of the information included in the media content descriptor may be transmitted to the terminal. In this case, the terminal may perform only the function corresponding to the transmitted information.

TABLE 1

```
<!--------------- mediaConetsManifest.xml ----------------------------->
<Contents xsi:noNamespaceSchemaLocation="Samsung_mmt.xsd"
xmlns:xsi=http://www.w3c.org/2001/XMLSchema-instance>
<ContentItem>
    <Title xml:lang="en-us">English</Title>
    <Synopsis xml:lang="en-us">String</Synopsis>
    <OriginSite>http://samsungmmtexample.com</OriginSite>
    <OriginSiteName>SamsungExample</OriginSiteName>
    <ContentID>123123109</ContentID>
    <ContentURL VideoCoding="AVC" Duration="14:30:00:00" MediaFormat="MP4"
DRMSystemID="128" MD5Hash="String" MIMEType="video/mp4" TransferType="AS"
AudioCoding"AAC">
http://samsungexample.com/vod/movies/123123109/Description/MainContentsDescription.xml
</ContentURL>
<!------------------ mediaFileStructre ------------------------------------>
<ContentType>
<URLTemplate> </URLTemplate>
<NextControlURL> </NetxtControlURL>
<RelDataURL> </RelDataURL>
<Track ID=1 GOP="9" StartTime=0.00 mode=normal Bitrate=40000 SegmentStartID=01
SegmentDuration=1 SegmenCount=1>
<Segment ID=1 StartTime=0.00 Duration=1> </SegmentID>
<Track ID=2 GOP="3" StartTime=0.00 mode=TrickPlay Bitrate=10000 SegmentStartID=01
SegmentDuration=1 SegmenCount=1>
    <Segment ID=1 StartTime=0,.00 Duration=1> </SegmentID>
</Track>
</ContentType>
```

The media content descriptor is described in further detail as follows with reference to Table 1.

The media content descriptor includes manifest information and file structure information.

As an element of a 'Contents' attribute representing Schema information being referenced by the media content descriptor, the manifest information of the media content includes at least one of 'Title' information, 'Synopsis' information, 'OriginSite' information including creator information of the media content, 'OriginSiteName' containing a name of the creator of the media content, 'ContentID' for identifying the media content, 'ContentsURL' information by which control information of the media content may be referenced, and 'ContentItem' information representing the media content itself.

The file structure information, which represents a file structure of the media content data, includes as a container element of a 'ContentType' attribute, information such as 'URLTemplate' representing a positioning method of the actual media content data in the streaming or download method, 'NextControlURL' which is controlled based on the next GOP unit, 'RelDataURL' by which additional information such as X-speed information and information about the time supportable in random access, can be referenced, and 'TrackID' by which normal-mode data available in the normal mode and trick-mode data available in the X-speed play mode or the random access mode can be identified.

The controller 353 of the client 350 may analyze a MainContentsDescription.xml file with ContentURL included in the manifest information, and send a request for desired media content data information to the server 300 on a GOP basis. For example, while viewing a video clip in the normal play mode at an initial state, a user may switch from the normal play mode to the X-speed play mode or the random access mode upon requesting the X-speed play function or the random access function. In this case, the client 350 sends, to the server 300, a request for manifest information for the X-speed play or the random access. Upon receiving the manifest information in Table 1 from the server 300, the client 350 may send a request for a MainContentsDescription.xml file to an address included in the ContentsURL information included in the manifest information, and receive trick-mode data for the X-speed play or random access from the address.

Figure 4:
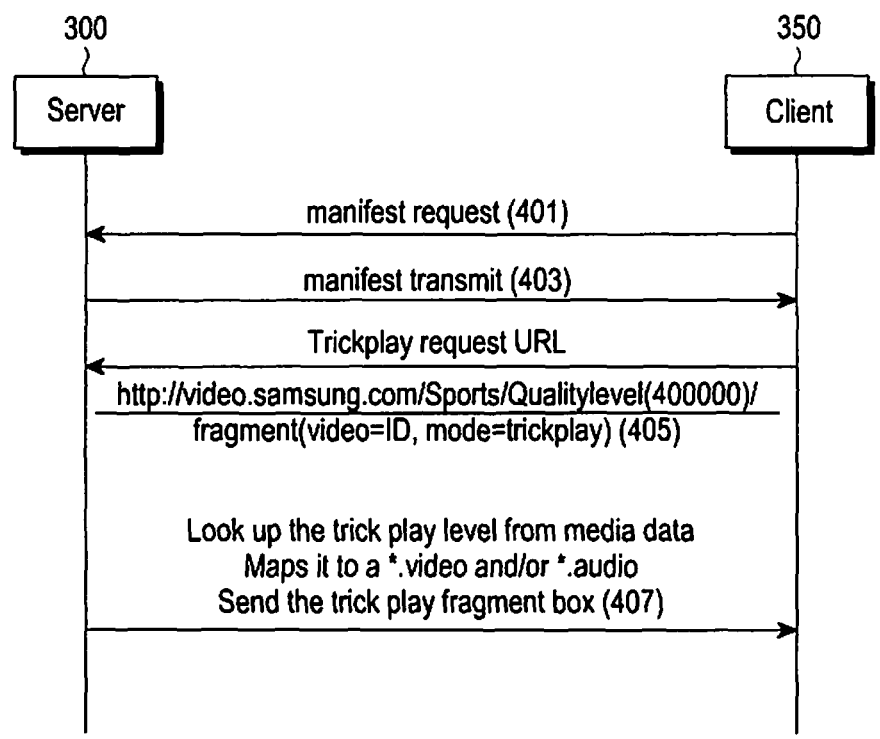
FIG. 4 is a flow diagram illustrating an operation between a server and a client in a media content playing apparatus according to an embodiment of the present invention.

FIG. 4 illustrates an operation between a server and a client with a media content playing apparatus according to an embodiment of the present invention.

Referring to FIG. 4, the operation is performed between the server 300 and the client 350 in accordance with the data file structure described in Table 1. According to process, if a user of a client desires the X-speed play or random access while receiving specific media content data from a server and playing the received data, the client sends a request for manifest information to the server, receives the manifest information from the server in response to the request, analyzes the received information, and requests the X-speed play or random access function if the analyzed information indicates that the server supports the X-speed play or random access function. It is assumed in FIG. 4 that the X-speed play is requested.

More specifically, if a user of the client 350 desires X-speed play while receiving and playing specific media content data, the client 350 requests the server 300 to transmit manifest information in step 401. In response, the server 300 transmits the requested manifest information to the client 350 in step 403.

In step 405, the client 350 analyzes a MainContentsDescription.xml file with ContentURL included in the received manifest information, and sends a request for the X-speed play function to the address (e.g., a URL) of the server 300, included in the ContentURL, if the analyzed information indicates that the server supports the X-speed play function. In response, the server 300 transmits a fragment box related to the X-speed play to the client 350 in step 407. For reference, the term 'fragment box' refers to collection of information required for execution of a specific function. The client 350 performs X-speed play using information included in the fragment box.

FIGS. 5 to 8 illustrate configurations of normal-mode data and trick-mode data according to an embodiment of the present invention.

As previously stated herein, the normal-mode data is data available in the normal play mode, while the trick-mode data is data available in the X-speed play mode or the random access mode. According to embodiments of the present invention, the trick-mode data is generally configured to be ¼ times or 1/N (where N is several tens, i.e., 10, 20, 30, etc.) times the normal-mode data in size, and the GOP value of the trick-mode data is also set smaller than that the GOP value of the normal-mode data, increasing the frequency of I frames (or the number of occurrences of I frames). In other words, the trick-mode data has an overall lower amount of data than the normal-mode data, while I frames of the trick-mode data appear more frequently than I frames of normal-mode data. Therefore, use of the trick-mode data increases the speed of transmission/reception and decoding, compared with use of normal-mode data. As a result, the time delay in the X-speed play and random access is decreased, and enables a user to obtain precise playback and/or search of media data. According to embodiments of the present invention, the normal-mode data may still be played in either of the X-speed play mode or the random access mode, while the trick-mode data may be played in the normal play mode. However, it is assumed herein that the user will elect to use the normal-mode data in the normal play mode, and the trick-mode data in the X-speed play mode or the random access mode.

Figure 5A:
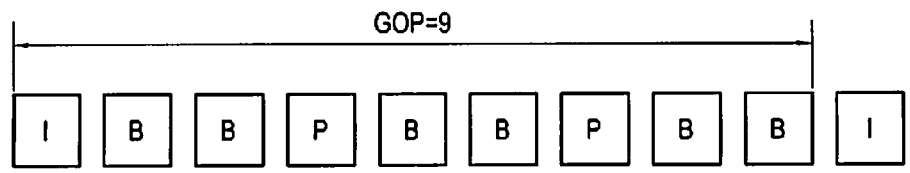
FIGS. 5 to 8 are diagrams illustrating file structures defined by media content descriptors according to an embodiment of the present invention.
Figure 5B:
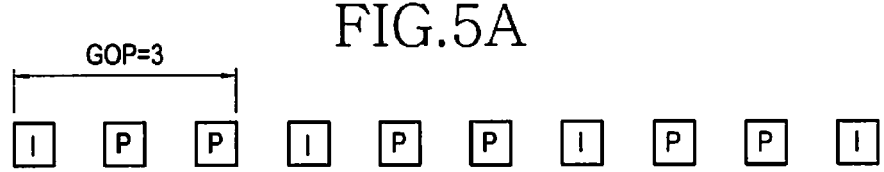

FIG. 5A illustrates normal-mode data with GOP=9, and FIG. 5B illustrates trick-mode data with GOP=3. The trick-mode data in FIG. 5B is smaller than the normal-mode data in FIG. 5A in terms of both the GOP value and the data size.

FIGS. 6 to 8 illustrate other configurations of normal-mode data and trick-mode data according to an embodiment of the present invention.

Figure 6A:
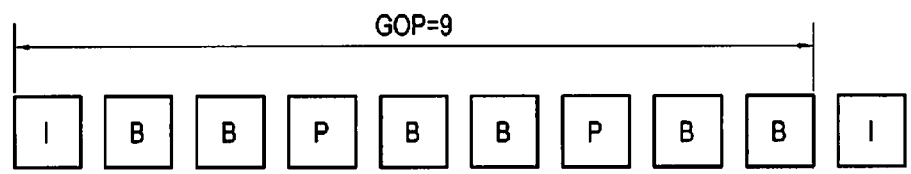
Figure 6B:
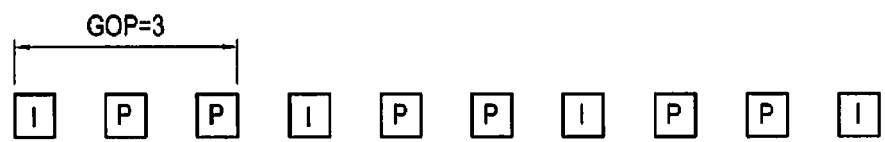
Figure 6C:

FIGS. 6A to 6C illustrate an example, where the data in FIGS. 6A and 6B is identical to the data in FIGS. 5A and 5B, respectively. FIG. 6C illustrates trick-mode data configured to include only I frames. If the trick-mode data includes only I frames, the play speed in the X-speed play and the shift speed in the random access may be further increased.

Figure 7A:
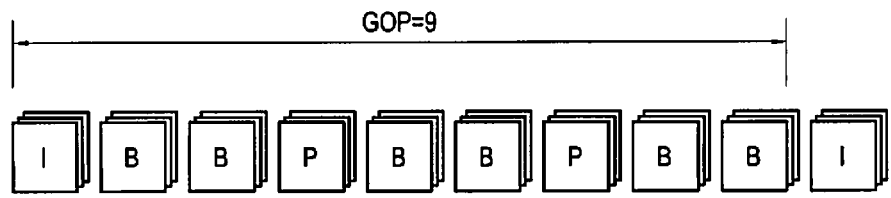
Figure 7B:
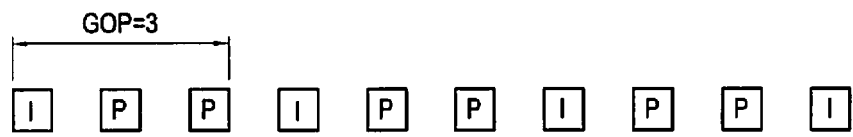
Figure 7C:

FIGS. 7A to 7C illustrate another example, where FIG. 7A illustrates an example of complex (or multi-layer) normal-mode data. For example, if each frame includes 3-layer data, data scalability may be achieved using the 3-layer data. Data in FIGS. 7B and 7C is equal to the data in FIGS. 6B and 6C, respectively.

Figure 8A:
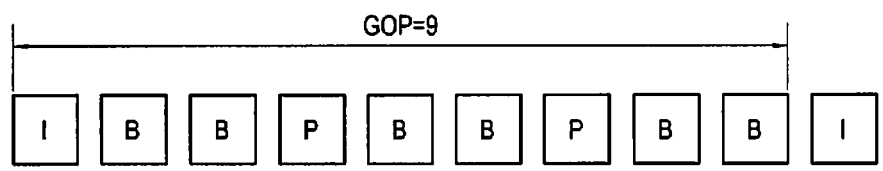
Figure 8B:
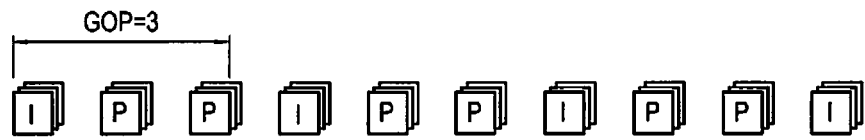
Figure 8C:

FIGS. 8A to 8C illustrate yet another example, in which trick-mode data is realized in scalable data. That is, normal-mode data in FIG. 8A is equal to the normal-mode data in FIG. 5A. However, the complex (or multi-layer) trick-mode data in FIGS. 8B and 8C are configured by combining multiple sets of the trick-mode data in FIGS. 6B and 6C, respectively, to support the scalability thereof.

As illustrated in FIGS. 7 and 8, the media content data of the present invention may include multi-layer normal-mode data (FIG. 7A) and/or multi-layer trick-mode data (FIGS. 8B and 8C). When configured in a multi-layer data structure, the media content data may support scalability. As the normal-mode data and the trick-mode data are presented independently from each other, they may be played in different times independently.

As described above, the user plays the normal-mode data in the normal mode. Also, the user may choose to play the trick-mode data in the X-speed play mode or the random access mode. For example, while the normal-mode data is being played in the normal mode, if the user chooses the X-speed play mode, the client requests trick-mode data and plays the trick-mode data in the X-speed play mode.

While the normal-mode data is being played in the normal mode, if the user chooses to play the trick-mode data in the X-speed play mode, the controller 353 analyzes system time clock information, by which the controller 353 provides time information in the normal-mode data to the output unit 359 and the decoder 361, and then requests the trick-mode data according to the analysis results. Therefore, if X2-speed play is requested during play of the normal-mode data, the client plays the trick-mode data at a double speed.

Figure 9A:
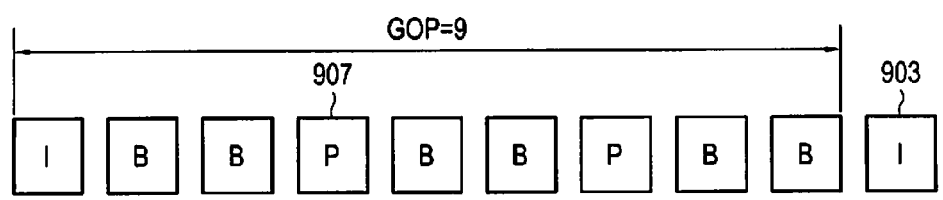
FIGS. 9A and 9B are diagrams illustrating a media content playing method according to an embodiment of the present invention.
Figure 9B:
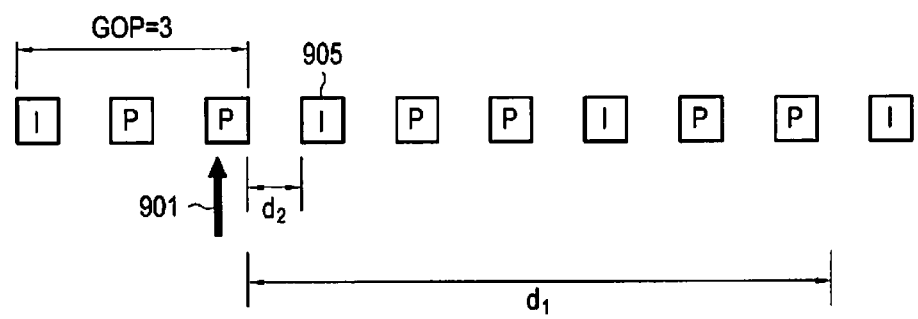

FIGS. 9A and 9B illustrate an operation of performing random access using trick-mode data according to an embodiment of the present invention. FIG. 9A illustrates normal-mode data, while FIG. 9B illustrates trick-mode data.

Referring to FIGS. 9A and 9B, while the normal-mode data (as shown in FIG. 9A) is being played, a random access request is made by a user at a time 901. Conventionally, when random access is made on the normal-mode data (FIG. 9A), decoding starts beginning from the next I frame 903 rather than the P frame 907 succeeding the time 901, causing a time delay of $d_1$. However, when random access is made on the trick-mode data (as shown in FIG. 9B), decoding may start beginning from the I frame 905 just next to the time 901, reducing the time delay to $d_2$, which is remarkably shorter than the conventional delay time $d_1$.

Figure 10:
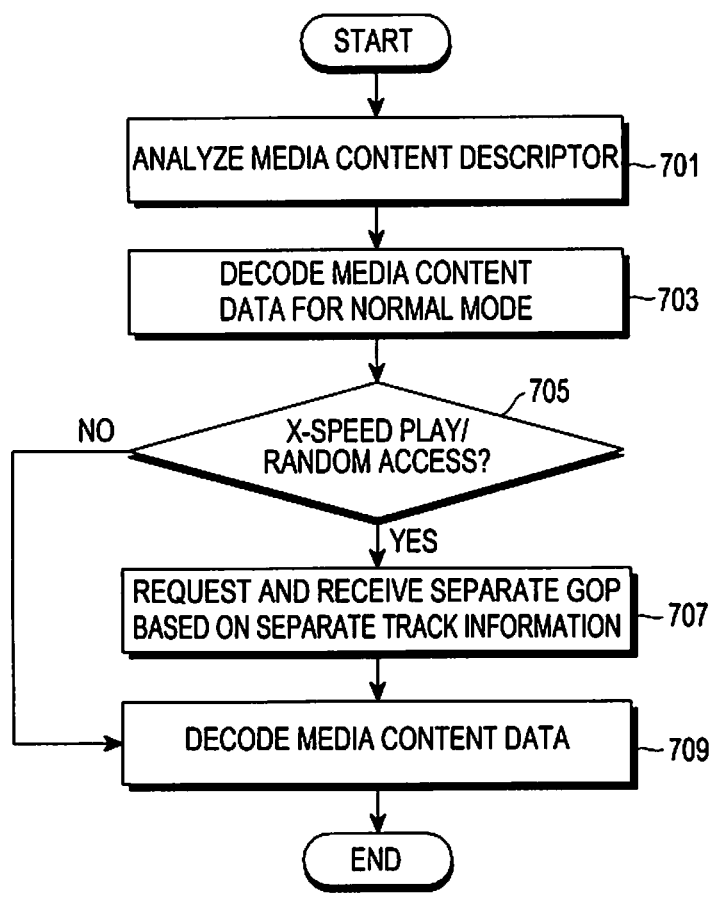
FIG. 10 is a flowchart illustrating a media content playing method according to an embodiment of the present invention.

FIG. 10 illustrates a media content playing method according to an embodiment of the present invention, in which a client 350 has sent a request for a media content descriptor to a server 300 to play normal-mode data.

Referring to FIG. 10, in step 701, the client 350 analyzes a media content descriptor that the client 350 has received from the server 300 in response to the request. In step 703, if information about normal-mode data is included in the media content descriptor, the client 350 requests/receives normal-mode data from the server 300, and decodes the received normal-mode data.

In step 705, the client 350 determines whether a switching request to an X-speed play mode or a random access mode has been received from a user while the normal-mode data is being played. Upon receiving the switching request, the client 350 stops decoding the normal-mode data and proceeds to step 707.

In step 707, the client 350 sends a request for trick-mode data to a URL according to track information (i.e., a server's URL address included in 'ContentURL' described herein with reference to FIG. 4) included in the media content descriptor, and receives the requested trick-mode data. In step 709, the client 350 decodes media content data corresponding to the received trick-mode data.

However, upon failure to receive the switching request in step 705, the client 350 proceeds directly to step 709, and continues to decode and play the normal-mode data in the normal play mode.

Figure 11A:
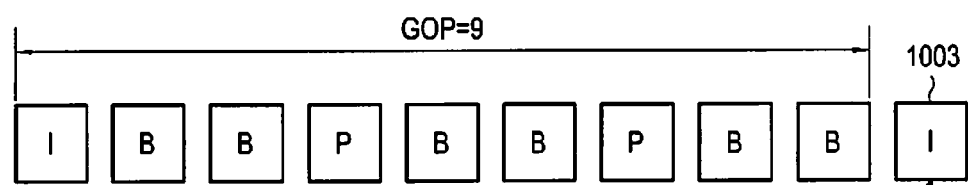
FIGS. 11A and 11B are diagrams illustrating a media content playing method according to another embodiment of the present invention.
Figure 11B:
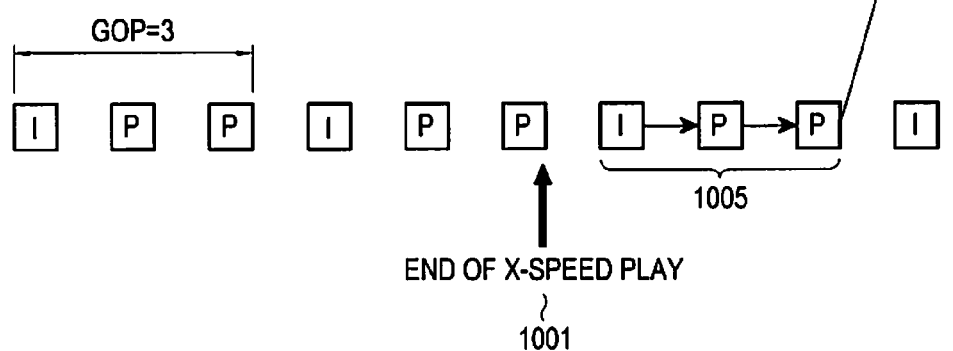

FIGS. 11A and 11B illustrate a media content playing method according to another embodiment of the present invention.

In the example of FIGS. 11A and 11B, a user has chosen not to play normal-mode data in an X-speed play mode or a random access mode. While trick-mode data is played in the X-speed play mode or random access mode, if the user requests switching from the X-speed play mode or random access mode to the normal mode, the client performs mode switching and plays the trick-mode data in the normal mode according to an embodiment of the present invention. FIG. 11A illustrates normal-mode data, while FIG. 11B illustrates trick-mode data.

As assumed above, the client 350 is playing media content using the trick-mode data (as shown in FIG. 11B) in the X-speed play mode or random access mode. While the trick-mode data (as shown in FIG. 11B) is played, if the user requests switching to the normal mode at a time 1001, the client 350 stops playback of the trick-mode data (i.e., trick play) and playback the normal-mode data (FIG. 11A) at the time 1001. In this case, however, because decoding of the normal-mode data starts beginning from an I frame as described above, a time difference occurs between an end time 1001 of the trick play and a first I frame 1003 in the normal-mode data after the end time 1001 of the trick play, resulting in a delay time. No content is played during this delay time.

According to another embodiment of the present invention, to ensure continuous content play for the delay time, the existing trick-mode data is used to continue playback during this delay time. More specifically, during the time period between the end time 1001 of the trick play and the first I frame 1003 in the normal-mode data, frames 1005 of the trick-mode data are decoded in order of I⇒P⇒P frames. Thereafter, if reception of the first I frame 1003 in the new GOP period in the normal-mode data is completed, the normal-mode data is decoded to play content.

According to another embodiment of the present invention, the media content playing apparatus described with reference to FIG. 3 operates as follows.

The controller 353 determines whether a switching request from an X-speed play mode or a random access mode to the normal mode has been received from a user. Upon receiving the switching request to the normal mode, the controller 353 informs the analyzer 355 of the switching request. The analyzer 355 analyzes ContentURL of the server 300, included in manifest information of a received media content descriptor, and provides a URL of the server 300 to the controller 353 according to the analysis results. The controller 353 sends a request for normal-mode data to the URL on a GOP basis beginning from a new I frame.

The decoder 361 continues to decode the existing trick-mode data until the decoder 361 receives I-frame data in a new GOP period of the normal-mode data from the server 300 and decodes the received frame data. Upon receiving a first I frame in the new GOP period of the normal-mode data, the controller 353 stops the decoding of the trick-mode data, and controls the decoder 361 to decode the normal-mode data. The decoder 361 decodes the normal-mode data under control of the controller 353.

As the manifest information described in the present invention is used to provide information for provision of a media content service, service setting, and/or service initialization, the manifest information may be alternatively be referred to as 'configuration information', for example. However, any other names are also available as long as information thereof has the same meanings or roles as the manifest information. Although basic fields and/or their attribute information needed to describe embodiments of the present invention have been described so far, information of a configuration file described in each embodiment of the present invention may further include additional information as fields and attributes according to the environments or services. Also, while logical means of information included in the configuration file have been illustrated and described so far, the information may be represented in the form of various information representation structures or formats, such as eXtensible Markup Language (xml), binary data, and a formatted information structure, according to the system and service production/provision environment.

As is apparent from the foregoing description, in providing complex content including multiple source contents or multiple streams, the present invention sets a repeat cycle of intra-refresh frames for trick-mode data to be shorter than a repeat cycle of intra-refresh frames for normal-mode data in a video service such as Digital TV that uses the streaming and download methods, thereby supporting a precise X-speed play function and minimizing an increase in bit rate and a time delay during random access.

In addition, according to embodiments of the present invention, by setting time points of intra-refresh frames in a trick-mode data layer that are different from time points of intra-refresh frames in a basic layer, the bit rate is prevented from being concentrated on intra-frames and forming a peak, facilitating planarization of the bit rate.

Another effect of embodiments of the present invention reduces complexity of Picture-In-Picture (PIP) screens to ¼ or 1/N (where N is several tens), PIP may be simply implemented, and if the available bit rate is variable like in the wireless network or Internet Protocol (IP) network, only separate trick-mode data may be transmitted according to the network situation.

Meanwhile, various other effects of the present invention have been disclosed explicitly or implicitly in the foregoing detailed description of embodiments of the present invention.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for playing media content by a client in a data communication network, comprising:
    sending, to a server, a request for a media content descriptor;
    receiving, from the server, a media content descriptor including a Uniform Resource Locator (URL) for access to specific media content data configured for execution of a specific function and information of a repetition period cycle for the specific media content data; and
    receiving the specific media content data using the URL included in the received media content descriptor according to said information of the repetition cycle,
    wherein the specific media content data is a different version of original media content data,
    wherein the received media content descriptor includes information of a Group Of Picture (GOP) of the specific media content data, wherein the specific media content data includes data having a quality that is lower than a quality of the original media content data.

2. The method of claim 1, wherein the specific media content data configured for execution of the specific function further includes trick-mode data.

3. The method of claim 1, wherein the receiving the specific media content data using the URL comprises:
    sending a request for the specific media content data to an address of the URL;
    receiving the specific media content data from a server corresponding to the address of the URL; and
    performing the specific function using the received specific media content data.

4. A method for supporting media content play of a client, by a server in a data communication network, comprising:
    receiving, from the client, a request for a media content descriptor; and
    transmitting, to the client, a media content descriptor including a Uniform Resource Locator (URL) for access to specific media content data configured for execution of a specific function and information of a repetition cycle for the specific media content data, wherein the specific media content data is a different version of original media content data, wherein the received media content descriptor includes information of a Group Of Picture (GOP) of the specific media content data, wherein the specific media content data includes data having a quality that is lower than a quality of the original media content data.

5. The method of claim 4, wherein the specific media content data configured for execution of the specific function further comprises trick-mode data.

6. The method of claim 4, further comprising:

receiving from the client a request for the specific media content data associated with an address of the URL; and transmitting the specific media content data stored according to the address of the URL, to the client.

7. An apparatus for playing media content by a client in a data communication network, comprising:

a controller for sending, to a server, a request for a media content descriptor, receiving, from the server, a media content descriptor including a Uniform Resource Locator (URL) for access to specific media content data configured for execution of a specific function and information of a repetition cycle for the specific media content data, and receiving the specific media content data using the URL included in the received media content descriptor according to said information of the repetition cycle, wherein the specific media content data is a different version of original media content data, wherein the received media content descriptor includes information of a Group Of Picture (GOP) of the specific media content data, wherein the specific media content data includes data having a quality that is lower than a quality of the original media content data.

8. The apparatus of claim 7, wherein the specific media content data configured for execution of the specific function further includes trick-mode data.

9. The apparatus of claim 7, wherein the controller sends a request for the specific media content data to an address of the URL, receives the specific media content data from a server having the address of the URL, and performs the specific function using the received specific media content data.

* * * * *